(12) United States Patent
Jarvis

(10) Patent No.: US 7,735,149 B2
(45) Date of Patent: Jun. 15, 2010

(54) MICROCLIMATE REGULATING GARMENT AND COMPOSITE STRUCTURE

(75) Inventor: Christine W. Jarvis, Six Mile, SC (US)

(73) Assignee: Clemson University

( * ) Notice: Subject to any disclaimer, the term of this patent is extended or adjusted under 35 U.S.C. 154(b) by 965 days.

(21) Appl. No.: 10/405,778

(22) Filed: Apr. 1, 2003

(65) Prior Publication Data

US 2004/0198122 A1 Oct. 7, 2004

(51) Int. Cl.
*A41D 13/00* (2006.01)
*A41D 13/002* (2006.01)
*A41D 13/005* (2006.01)

(52) U.S. Cl. .................. 2/69; 2/97; 2/102; 442/327

(58) Field of Classification Search ............ 442/327; 2/69, 81, 82, 97, 100, 102, 108
See application file for complete search history.

(56) References Cited

U.S. PATENT DOCUMENTS

| | | | | |
|---|---|---|---|---|
| 3,706,102 | A * | 12/1972 | Grenier ..................... | 2/84 |
| 4,194,041 | A * | 3/1980 | Gore et al. ................ | 442/289 |
| 4,294,242 | A | 10/1981 | Cowans | |
| 4,405,348 | A | 9/1983 | Pasternack | |
| 4,856,294 | A | 8/1989 | Scaringe et al. | |
| 5,111,668 | A | 5/1992 | Parrish et al. | |
| 5,515,543 | A * | 5/1996 | Gioello .................... | 2/69 |
| 6,187,696 | B1 * | 2/2001 | Lim et al. ................. | 442/77 |
| 6,766,817 | B2 | 7/2004 | da Silva | |
| 2003/0028948 | A1 * | 2/2003 | Chambers ................. | 2/69 |
| 2003/0145367 | A1 | 8/2003 | Isom et al. | |
| 2004/0083526 | A1 | 5/2004 | Ichigaya | |
| 2004/0148681 | A1 * | 8/2004 | Isom et al. .............. | 2/160 |
| 2006/0080987 | A1 | 4/2006 | Ichigaya | |

FOREIGN PATENT DOCUMENTS

| WO | WO 93/14929 | * | 8/1993 |
|---|---|---|---|
| WO | WO 9314929 | | 8/1993 |

OTHER PUBLICATIONS

Complete Textile Glossary, 2001, Celanese Acetate.*
Technical Report, *NBC Personnel Cooling Suit*, Technical Products, Inc., Nov. 20, 2002, pp. 1-25.
European Patent Office Search Report, Jul. 16, 2004.
E-mail to Wellington M. Manning from Elson Silva, 6 pages, May 13, 2006.

* cited by examiner

*Primary Examiner*—D. Lawrence Tarazano
*Assistant Examiner*—Matthew D Matzek
(74) *Attorney, Agent, or Firm*—Dority & Manning, P.A.

(57) ABSTRACT

This invention is for a composite structure and a garment constructed from the composite structure which can be worn next to the skin or as outerwear as well as a process for making the composite structure and garment. The garment provides microclimate control for the wearer by means of at least one three-dimensional passageway formed by an outer cover material which is secured to a first substrate layer. The passageway contains a filler material which adds support to the walls of the passageways and allows a fluid to flow through the filler material. The passageway provides a thermal insulation by its bulk or by allowing a fluid to be pumped through it. The first substrate layer is breathable to increase the comfort level of the wearer.

40 Claims, 6 Drawing Sheets

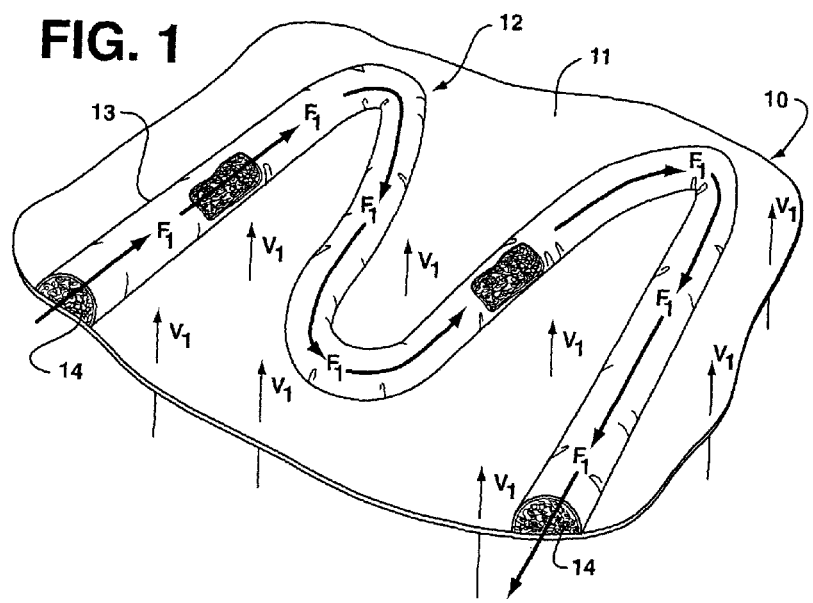
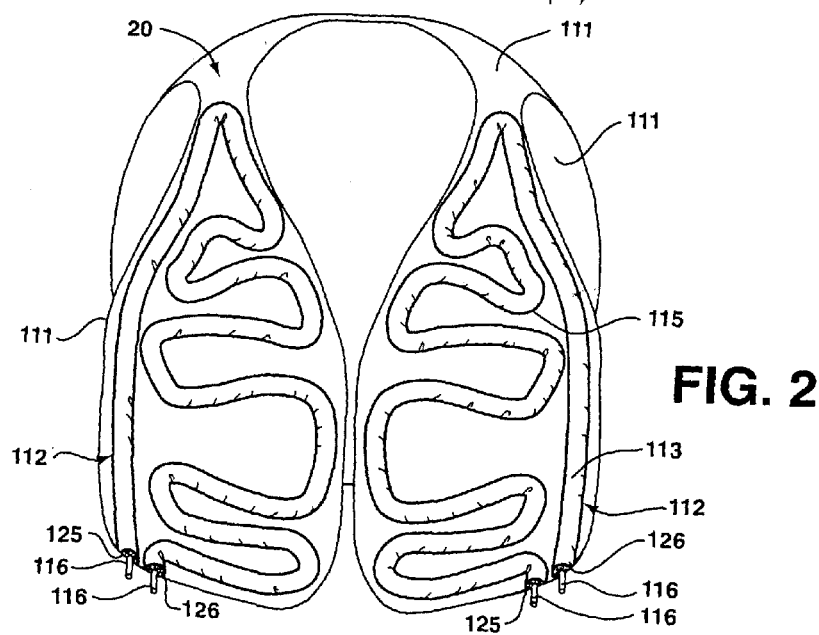

MICROCLIMATE REGULATING GARMENT AND COMPOSITE STRUCTURE

FEDERALLY SPONSORED RESEARCH OR DEVELOPMENT

Research through which this invention was developed was sponsored by a grant from the National Institute of Justice under grant no. MIPT 106-113-2000-21.

BACKGROUND OF THE INVENTION

In the area of active protective apparel, a need exists for improved, lightweight, multifunctional garments and equipment which can be worn in changing environments for extended periods of time. A single unit or garment is desirable that is adaptable to a variety of challenges, reducing the necessity of carrying additional specialized units and meeting the requirements of low bulk and weight. Such a garment would be useful for emergency responders and military personnel, as well as for persons involved in other outdoor activities.

The provision of a microclimatizing garment capable of insulating against temperature extremes, while also maintaining comfort and health by promoting normal moisture evaporation from the skin, represents an advancement of the art both in terms of performance and simplicity of design. Other similar constructions rely on bulky or technically complex internal materials to provide the insulative or heat exchange function. For example, some garments rely upon an open-celled foam placed adjacent to the wearer's skin to act as both a thermal insulator and to promote static transport of moisture from the skin to a secondary absorbent layer. The breathability of such foam is limited. Further, the absorbent layer traps moisture and thereby lessens the wear-cycle time of the garment due to saturation and potential microbial growth in the absorbent layer.

Other state-of-the-art garments employ an insulative pocket that contains a phase-change, heat transfer material. Optimum functionality of this design relies upon the use of ice, also placed in pockets in the garment. Obviously, this design has limited utility as a field item and would be for short-term, acute use only.

Another design uses a bladder system having channels through which a fluid may be pumped. Within the channels of the bladder system, a solid ribbon of closed cell foam is placed to force the channel to maintain its desired shape to maximize the contact area of the channels against the skin of the wearer. In order to allow the fluid to flow in the channels, the channel walls must be expandable to allow the fluid to flow around the solid ribbon of closed cell foam. A pressure required to pump the fluid through such a system can cause problems. The pressure causes the garment to be more rigid than is desirable and puts a large stress in the channel walls. In such a system, only a liquid can be used effectively. Since the fluid must flow around the closed cell foam ribbon, at least part of the fluid will flow in the section of the channel above the ribbon of closed cell foam. This part of the fluid flow does not aid in the transfer of heat in relation to the wearer's body. By fulfilling the purpose of maintaining the desired shape of the channels, the closed cell foam ribbon can actually isolate that part of the fluid flow, rendering it useless. Further, the use of a solid ribbon of closed cell foam prevents the flow of the fluid if a crease occurs in the channel or the channel is compressed.

SUMMARY OF THE INVENTION

The present invention provides a breathable insulative garment containing zones of high moisture vapor transport, which prevents trapping moisture in the garment that lessens wear-cycle time due to saturation and limits promotion of microbial growth. The present invention allows long-term use in the field due to the design and properties of the garment. In particular, the present invention also provides passageways within a garment through which a fluid, liquid or gas can flow, even in the event of a compression of the passageway. Additional advantages of the invention will be set forth in part in the following description, may be obvious from the description, or may be learned through practice of the invention.

In accordance with the purpose of the present invention, a composite structure, an article of clothing and methods for manufacturing a garment and composite structure are provided for controlling and regulating the microclimate of the environment next to the wearer's body. The composite structure is preferably a fabric. It contains a breathable first substrate layer. This first substrate layer preferably has a moisture vapor transmission rate of at least about 500 grams per square meter per day. An outer cover material is secured to the first substrate layer, forming at least one enclosed passageway. The outer cover material at least partially forms the wall of the passageway. The first substrate layer may also form part of the wall. Preferably, the outer cover material forms all walls of the passageway.

The passageway contains within its walls a filler material which allows a convoluted flow of fluid through the passageway. The filler material is a textile material, preferably fibers, yarn, a web, a batting or a fabric such as a knit, woven or nonwoven structure that adds stability to the passageway walls. Further, porosity of the filler material, as a grouping of parts within the passageway walls or individually, permits the fluid to flow through the filler material as it flows through the passageway. The filler material slows the flow of the fluid while not substantially impeding the flow therethrough. The outer cover material which forms the passageway forms a pattern over the surface area of the first substrate layer in such a manner that the composite structure can be used to control the microclimate surrounding the structure.

An article of clothing for providing microclimate control to the wearer has portions which include a breathable first substrate layer having an outer cover material secured to the substrate layer, thereby forming at least one enclosed passageway on the first substrate layer. The outer cover material forms at least partially the walls of the passageway. The passageway forms a pattern on the surface area of the first substrate layer. A filler material is contained within the walls of the passageway formed by the outer cover material. The filler material is preferably a textile product. The filler material, as a grouping of parts within the passageway walls or individually, is porous enough to allow a fluid to flow through the filler material in the passageway. The filler material adds structure supporting the passageway walls, while not significantly impeding the flow of the fluid within the passageway. Fluid entrances and exits can be formed by the outer cover material to which connectors can be attached allowing the passageway to be connectable to portable heat exchangers and other passageways within other garments or other panels within the same garment.

The method of manufacturing a garment for providing microclimate control to the wearer includes providing a first substrate layer panel. An outer cover material is secured to the first substrate layer panel in a manner that the outer cover material forms at least one passageway over a surface area of the first substrate layer panel so that the garment can effectively regulate the microclimate surrounding portions of the wearer's body covered by the garment. A filler material having a porosity to allow a fluid to flow therethrough is placed under the outer cover material, between two pieces of the outer cover material before the passageway is formed, or may be placed in the passageway after the passageway is formed. The garment is formed by attaching the first substrate layer panels together as needed to create the garment. The first substrate layer panels may be attached together to form the basic shape of the garment before the outer cover material is secured to the substrate layer panels which forms the passageways containing the filler material. Further, the garment may be made of one substrate layer panel.

The first substrate layer panel should be a breathable fabric, preferably a woven, knit or nonwoven. The outer cover material is preferably a woven, knit, scrim, film or nonwoven. In some embodiments, the outer cover material should be non-permeable. The filler material can be a textile product. Fluid entrances and exits can be formed in the outer cover material to allow attachments of connectors to the entrances and exits.

One method that may be used to make a composite structure for providing microclimate control to the wearer includes providing a non-thermoplastic first substrate layer having a front side and a back side. A thermoplastic filler material is laid over the front side of the first substrate layer. A thermoplastic outer cover material is placed over the filler material, so that the filler material is between the first substrate and the outer cover material. The outer cover material and the filler material are then cut with a thermal device in a manner that an enclosed passageway is formed with the outer cover material containing the filler material within the passageway walls. The thermal device melts the edges of outer cover material thereby causing the melted edges to interlock with the non-thermoplastic first substrate layer forming a composite fabric with passageways containing the filler material. Appropriate first substrate layers can then be sewn together to form a desired garment. Also as above, the garment may be made from a single first substrate layer by cutting the pattern of the garment out of a single composite fabric structure and properly sewing or attaching the appropriate ends of the cut composite fabric structure forming the garment.

Other features of the present invention will be described in greater detail below through the use of the appended figures.

BRIEF DESCRIPTION OF THE DRAWING

FIG. 1 shows a perspective view of an embodiment of the present invention as a composite fabric demonstrating fluid flow and transmission of vapor;

FIG. 2 shows an embodiment of the present invention as a garment or article of clothing;

DECRIPTION OF THE INVENTION

Figure 3A:
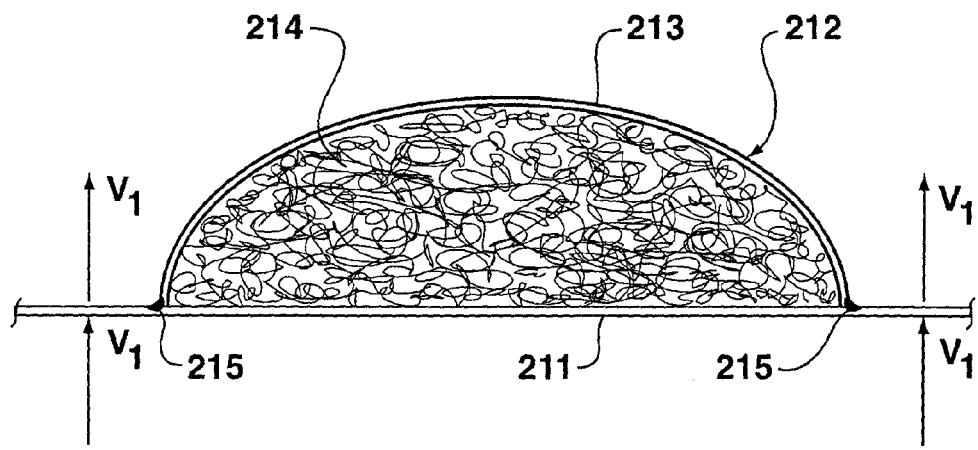
FIG. 3A shows a cut-away side view of an embodiment of a passageway with an outer cover material and the first substrate layer forming the passageway walls.

Reference will now be made in detail to the presently preferred embodiments of the invention, one or more examples of which are shown in the figures. Each example is provided to explain the invention and not as a limitation of the invention. In fact, features illustrated or described as part of one embodiment can be used with another embodiment to yield still a further embodiment. It is intended that the present invention cover such modifications and variations.

FIG. 1 illustrates a composite structure 10 representing an embodiment of the present invention. Preferably, the composite structure 10 is a composite fabric. Composite structure 10 has a first substrate layer 11. At least one enclosed passageway 12 is formed by attaching an outer cover material 13 to first substrate layer 11 in a pattern over first substrate layer 11. The outer cover material 13 creates at least part of the walls of the passageways. The walls of passageway 12 contain a filler material 14 within the interior of passageway 12. Composite structure 10 is a layered construction having first substrate layer 11 and outer cover material 13 making up the walls of passageway 12 and filler material 14 enclosed within the walls of passageway 12. The composite structure 10 can be used to make products such as blankets or sleeping bags. Further, this composite structure 10 may be used to manufacture garments which can regulate the microclimate of the surroundings of the portions of the wearer's body covered by the garment.

FIG. 2 shows a garment 20 as a vest having the layered construction of a composite structure 10 of FIG. 1. Garment 20 is not limited to a vest. Other examples of garments that can utilize this layered construction include pants, shirts, jackets, footwear and headwear. The layered construction of garment 20, as with the composite structure 10, has a first substrate layer 111, outer cover material 113 forming an enclosed passageway 112 containing a filler material (not shown). In the embodiment shown, first substrate layer 111 forms the inside of the garment 20 and contacts the wearer when the wearer dons garment 20. Multiple passageways on the composite structure 10 or each garment 20 may be desirable.

Outer cover material 113 may be attached before or after the construction of garment 20 depending on how garment 20 is made. Garment 20 may be constructed of a single panel of first substrate layer 111 with a single passageway 112 formed by outer cover material 113 or multiple passageways 112 formed by outer cover material 113 that are interconnected. Also, multiple first substrate panels 111 may be used to construct garment 20 with a single passageway 112 formed by outer cover material 113 or multiple passageways 112 formed by outer cover material 113 that are interconnected.

For both the composite structure 10 and garment 20, first substrate layer 11 and 111 is preferably a non-thermoplastic fabric. The fabric can be made of a nylon or some other natural or man-made non-thermoplastic fiber that can wick away moisture. Such fabric may be a traditional woven, knit-type material or a nonwoven, including but not limited to spunbonds, hydroentangled, needlepunched, stichbonded, nets or scrims and composites of these. A fabric made of a blended yarn, such as a nylon/polyester blend, may be desirable. The first substrate layer 11, 111 could also be a film as well. The total basis weight of the fabric or film should allow the fabric or film to be sturdy enough to perform its intended task, yet light enough not to weigh the wearer down. First substrate layer 11, 111 should be breathable.

Figure 3B:
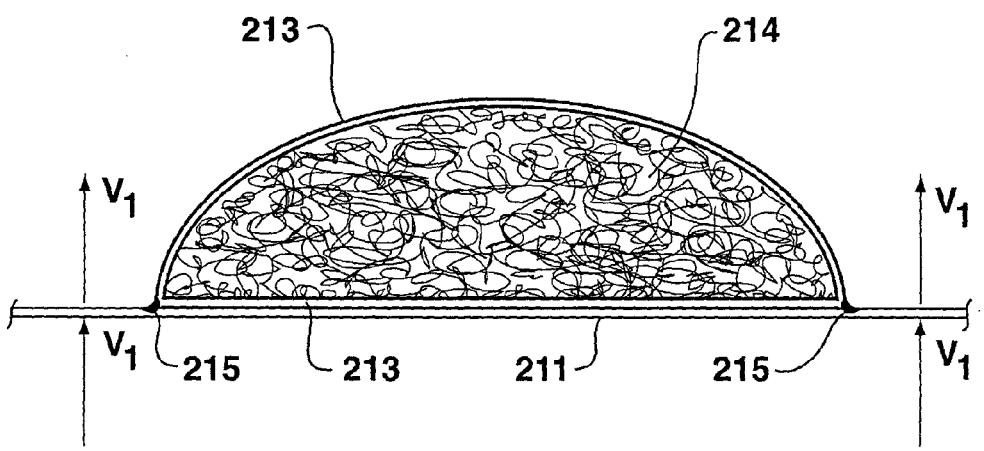
FIG. 3B shows a cut-away side view of an embodiment of a passageway with an outer cover material forming the passageway walls.

FIGS. 3A, 3B shows a cutaway side view of the construction of the composite structure 10 or garment 20. An outer cover material 213 can form the walls of the passageway 212 into which a filler material 214 is disposed. The outer cover material 213 is preferably a non-permeable thermoplastic film or fabric. An outer cover fabric may be a woven, knit, scrim or nonwoven. In one embodiment, the outer cover material is a polyurethane film. As with the first substrate layer, the total basis weight of outer cover material 213 should allow the outer cover material 213 to be sturdy enough to perform its intended task, yet light enough not to weigh the wearer down. The outer cover material is named as such due to the fact that it makes up at least part of the walls of the passageway.

The purpose of filler material 214 within a composite structure and garment is to add structure and stability to enclosed passageway 212 while at the same time allowing a fluid to flow through filler material 214 and thus, passageway 212 as well. Filler material 214 should be lightweight and porous to allow the flow of a fluid as necessary, while sturdy enough to enable passageway 212 to maintain its desired shape. Filler material 214 also decreases the amount of fluid necessary to flow through the enclosed passageway by consuming space within passageway 212. The decrease in the amount of fluid necessary to create the flow of fluid can translate into decreased weight, if the fluid is a liquid.

Filler material 214 is preferably a textile product. The textile product may be fibers, yarns, a batting, carded web or a fabric such as a knit, woven, braid, nonwoven, scrim or net or a composite thereof. Filler material 214 should have a high Z-coordinate directional aspect, which affords the material a three-dimensional character. A three-dimensional woven, knit, braid, batting or nonwoven having fibers or yarns oriented in the X, Y and Z-coordinate directions is preferable. Such products give added strength in the Z-coordinate direction to the filler material, due to fibers or yarns oriented in that direction. For example, in one embodiment, a three-dimensional warp knit spacer fabric is used. However, a traditional "flat" fabric having fiber or yarns oriented in the x-and y-coordinate direction made be used. If traditional "flat" fabrics are used, they should be layered, pleated or crumpled to create a more desirable three-dimensional aspect. Filler material 214 also should be resilient, for example, a filler material that has a memory. For example, filler material 214 may be a filament yarn that is configured to assume a three-dimensional shape due to bulking or crimping or the like.

The porosity of filler material 214 can apply to the filler material as a grouping of individual parts within the passageway walls, for example, a collection of fibers which do not necessarily form another structure like a batting. The fibers themselves do not have to be porous, but the grouping of the fibers which make-up filler material 214 should be. Further, an individual part of filler material can be porous, for example, a layer of a traditional "flat" fabric. As long as the fluid is permitted to flow through the structure created by filler material 214, the intended purpose is achieved. Such a filler material 214 allows the outer cover material to be distendable or not.

An example of a suitable nonwoven material is POWER-LOFT, a biocomponent, spunbond made by Kimberly-Clark in Corinth, Miss. In one embodiment, a high loft carded or airlaid structure, either bonded or unbonded, is used as filler material 214. A preferred fiber for the filler material which forms a carded or airlaid structure would be a non-circular cross-section fiber, for example, 4DG, available from Fiber Innovation Technologies (FIT) located in Johnson City, Tenn.

In the embodiment shown in FIGS. 3A and 3B, outer cover material 213 is secured to first substrate layer 211 at joinings 215. These joinings 215 can be mechanically, chemically or thermally created. For example, a stitching, adhesive or melting process may be used. When using a thermal cutting or attachment device, it is preferable for outer cover material 213 and filler material 214 to be a thermoplastic and first substrate layer 211 to be a non-thermoplastic. The thermal device melts outer cover material 213 and filler material 214 and presses the melted outer cover material into first substrate layer 211 causing outer cover material 213 to adhere to first substrate layer 211. Outer cover material 213 can include one or more pieces connected together to form the walls of enclosed passageway 212. As FIG. 3B shows, outer cover material 213 may form all the walls of enclosed passageway 212 surrounding filler material 214. Such an embodiment provides a passageway 212 which totally incases filler material 214 which can be advantageous. The joinings, which attach the pieces of outer cover material 213 together, may be different from the joinings which secure outer cover material 213 to first substrate layer 211. The pieces of outer cover material 213 may be from the same material or different types of material. For example, one piece of outer material 213 may be a polyester fabric and the other piece a polypropylene fabric. However, if thermal bonding occurs, the melting points of the materials should be in proximity of each other.

Passageway 212 may be formed before outer cover material 213 is secured to first substrate layer 211 or during the attachment of outer cover material 213 to first substrate layer 211. Likewise, filler material 214 may be placed between two pieces of outer cover material 213 or between outer cover material 213 and first substrate layer 211 before the forming of the passageway 212 or filler material 214 may be inserted after the passageway 212 is formed.

Figure 4:
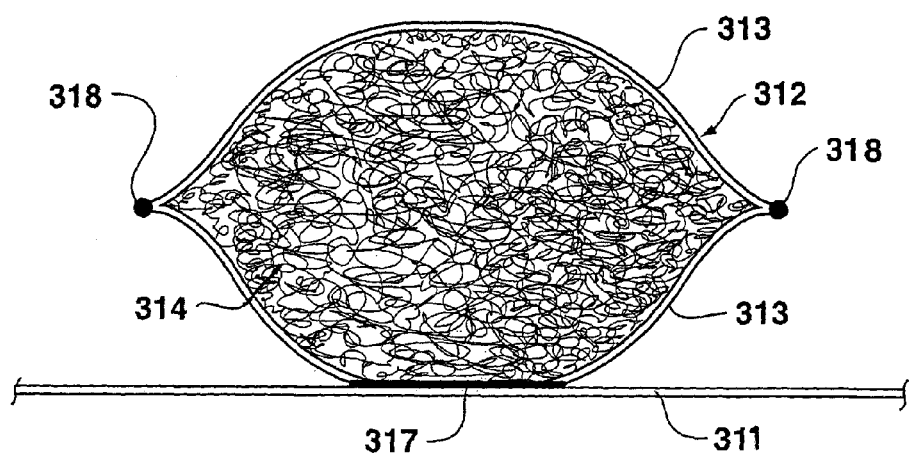
FIG. 4 shows a cut-away side view of a further embodiment of a passageway with an outer cover material forming the passageway walls.

FIG. 4 shows a different embodiment of a passageway from FIGS. 3A and 3B. In this embodiment, two pieces of outer material 313 are secured to each other to form the walls of a passageway 312 before outer cover material 313 is secured to first substrate layer 311. The two pieces of outer cover material 313 are attached by passageway joinings 318. Again, these pieces of outer material 313 may be the same type of material or different material. These passageway joinings 318 can be mechanically, chemically or thermally created. For example, a stitching, adhesive or melting process may be used. Outer cover material 313 can then be secured to first substrate layer 311 by fabric joining 317 which also can be mechanically, chemically or thermally created in the same or similar manner as the passageway joinings 318.

Figure 5:
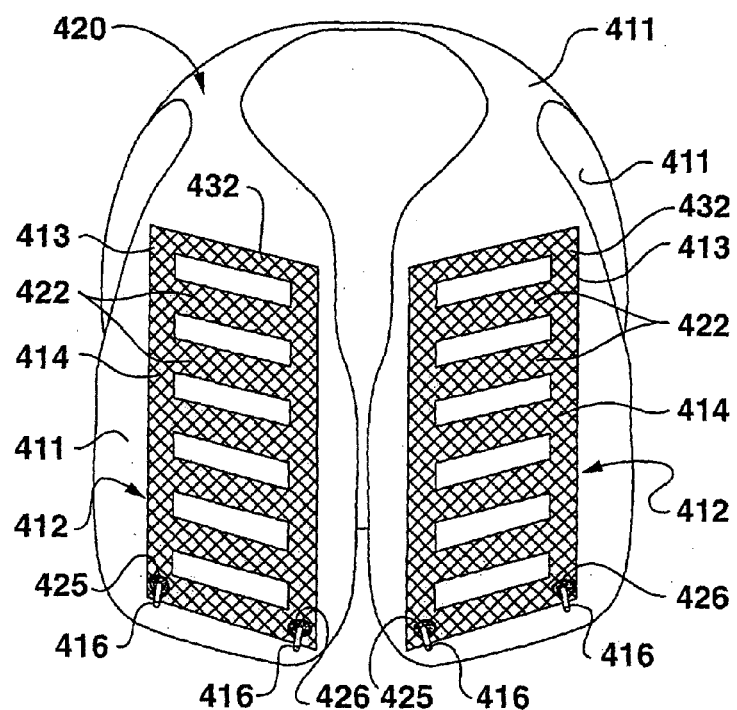
FIG. 5 shows a further embodiment of a pattern of an enclosed passageway on a composite structure, garment or article of clothing.

As seen in FIGS. 1, 2 and 5, enclosed passageway 12,112 and 412 should cover enough of the surface area of first substrate layer 11,111 and 411 to microclimatize the desired area of the wearer's body. Passageway 12, 112 and 412 may assume any type of pattern or shape on the first substrate layer 11, 111 and 411. Preferably, the pattern of passageway 12,112 and 412 will maximize cover area so that coverage allows the garment 20 to effectively regulate the microclimate surrounding portions of the wearer's body covered by the garment. In one embodiment, a serpentine-type pattern is used for passageway 12 and 112 as shown in FIGS. 1 and 2. The serpentine-type pattern may be longitudinal or latitudinal.

FIG. 5 shows a different embodiment of the passageway pattern on a garment 420. As with garment 20 in FIG. 2, garment 420 has a substrate layer 411 and a transparent outer cover material 413 that forms the walls of a passageway 412 which contain a filler material 414, which in this embodiment is a layered scrim. However, instead of a serpentine pattern of a passageway as in garment 20, passageway 412 of garment 420 possesses a block pattern with parallel latitudinal passageways 422 interconnected by parallel longitudinal passageways 432. Other passageway patterns can also be used as long as the coverage of the surface area is enough to regulate the microclimate surrounding the targeted area of the wearer's body.

Figure 6:
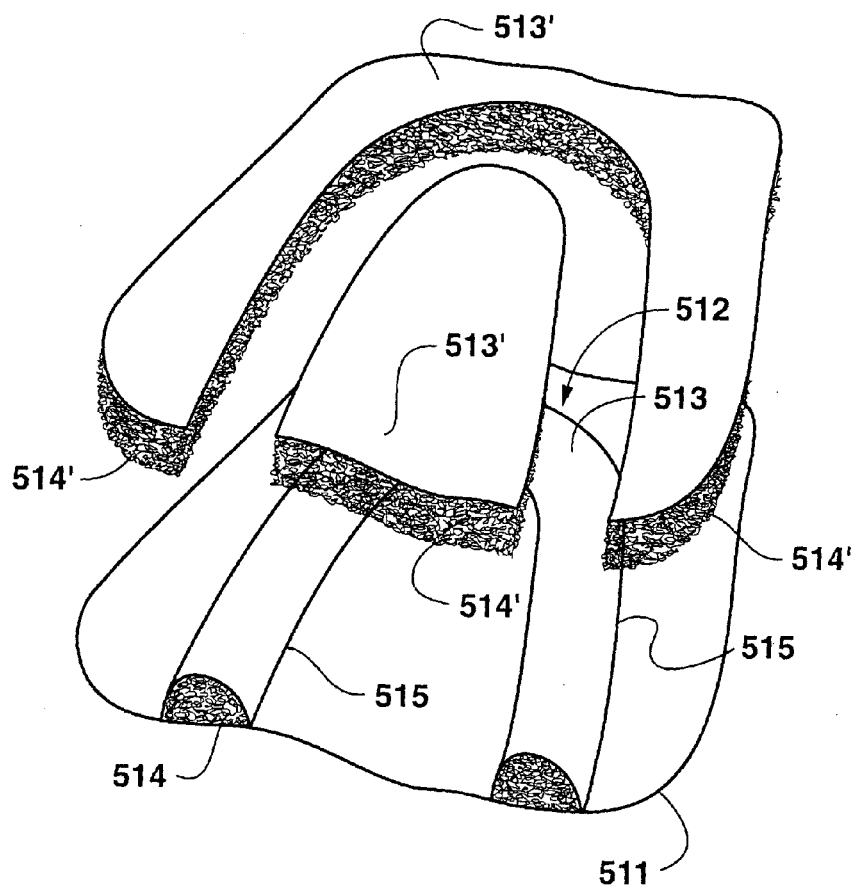
FIG. 6 shows a perspective view of an embodiment of a passageway where the passageway is formed by having an outer cover material over a filler material located on a first substrate layer and then the outer cover material is welded to the first substrate layer during a thermal cutting process.

As seen in FIG. 6, a filler material 514 can be placed between a sheet of an outer cover material 513 and first substrate layer 511. A thermal or ultrasonic cutting device may be used to simultaneously cut the edges of outer cover material 513 and seal the cut edges to first substrate layer 511 to form an enclosed passageway 512. Outer cover material 513 and first substrate layer 511 form the walls of passageway 512. The embodiment shown in FIG. 3A can be formed in this manner. FIG. 6 shows passageway 512 after the thermal cutting and sealing has occurred. Outer cover material 513 forms the exterior of the passageway 512 along with first substrate layer 511 and filler material 514 is contained within the interior of the walls of passageway 512 after the cutting and sealing process, while excess outer cover material 513' and excess filler material 514' may be removed. It is also possible to place filler material 514 between two sheets of outer cover material 513, all of which, in turn, are placed on top of first substrate layer 511. The same cutting and sealing process is then performed. In this second embodiment, the two sheets of outer cover material 513 form all the walls of the passageway 512 similar to the embodiment shown in FIG. 3B.

Figure 7:
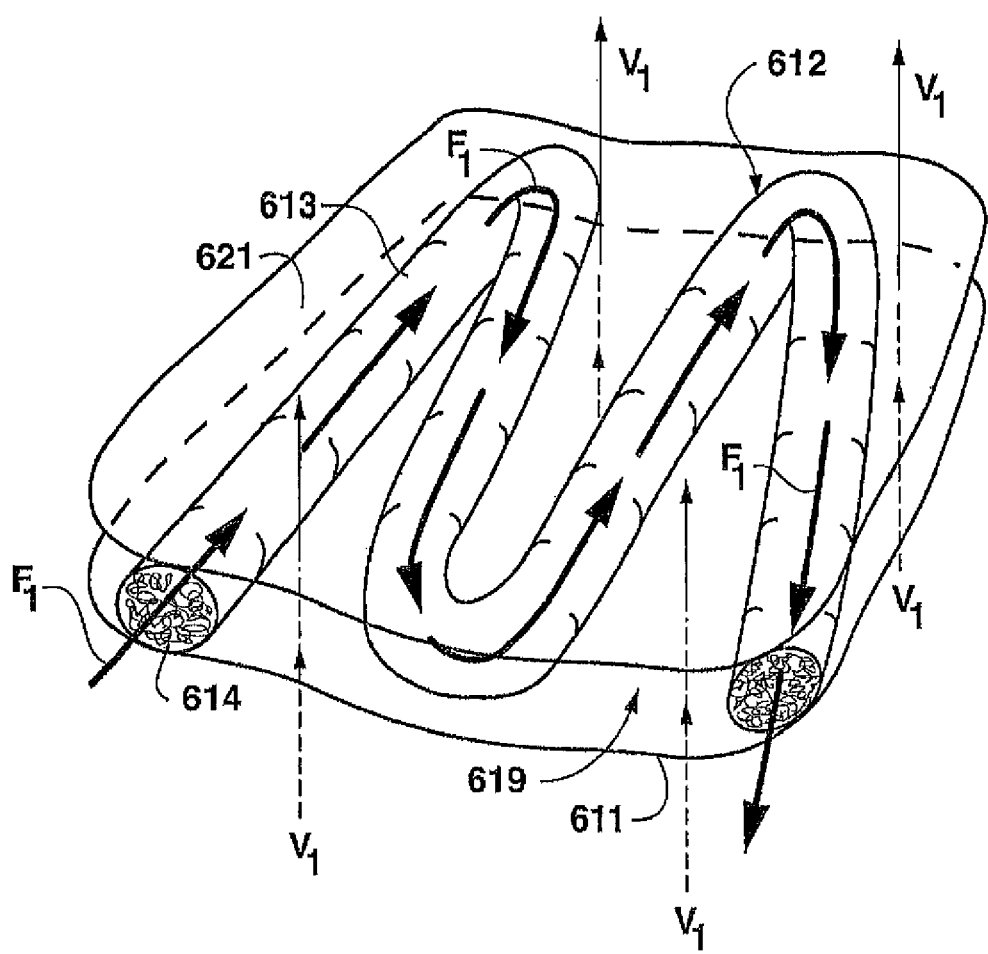
FIG. 7 shows a perspective view of an embodiment of the present invention having a second substrate layer and demonstrating fluid flow within the passageway and transmission of vapor through the first and second substrate layers.

As shown in FIG. 7, one embodiment possesses a second substrate layer 621 secured to the outer cover material 613 opposite the first substrate layer 611 and about parallel to the first substrate layer 611. This second substrate layer 621 should also be a breathable fabric, which is either a woven, knit or nonwoven that is sturdy enough to perform its intended task, yet light enough not to weigh the wearer down. The fabric's breathability prevents an unwanted build up of moisture between the two substrate layers. This second substrate layer 621 can provide added protection to the passageways 612 as well as the wearer of a garment. In some embodiments, it is preferable if the first and second substrate layers 611 and 621 are constructed of the same type of fabric. However, the same or different fabrics or films may be used as the first substrate layer 611 and the second substrate layer 621 within the same garment.

Since the first substrate layer in these embodiments are breathable, it should allow for moisture vapor transmission to occur by permitting perspiration or other moisture on the skin of the wearer to be wicked away or removed from the skin and evaporate. Reportedly, healthy, intact skin loses between 240 and 1,400 grams of perspiration per square meter per 24 hours (gsm/day). Therefore, in most embodiments, suitable fabrics for the first substrate layer will have moisture vapor transmission rates of about greater than or equal to 500 gsm/day, preferably about greater than or equal to 1,000 gsm/day. If an embodiment has a second substrate layer, it may also be desirable for this second substrate layer to have the same vapor transmission characteristics.

By using fabrics in the first substrate layer that allow a garment to be breathable, the garment is more comfortable to the wearer by preventing moisture from building up around the skin. At the same time, the moisture does not build up in the garment due to the fact that the first substrate layer is breathable. As seen in FIGS. 1, 3A and 3B, moisture $V_1$ can pass from the adjunct skin through first substrate layer 11 and 211 due to the layer's vapor transmission ability where the construction is not occupied by passageway 12 and 212. Thus, moisture build up is prevented in the composite structure 10 or garment 20 preventing saturation and microbial growth. As seen in FIG. 7, if a second substrate layer 621 is employed as described herein, then the moisture $V_1$ passes through first substrate layer 611 and is now contained in an open area 619 between first and second substrate layers 611 and 621, respectively, where passageway 612 is not located. The moisture $V_1$ then passes through the second substrate layer 621 also due to that layer's vapor transmission ability.

The garment in these embodiments permits controlling/regulating the microclimate surrounding the portion of the wearer's body covered by the garment in several ways. The filler material contained within the walls of the passageway at least partially formed by the outer cover material acts as an insulator trapping body heat. The trapped heat can keep the wearer warm if the wearer's environment is cold. At the same time, the body is able to maintain comfort by having perspiration removed efficiently from the skin via vapor transport through the breathable first substrate layer.

Figure 8:
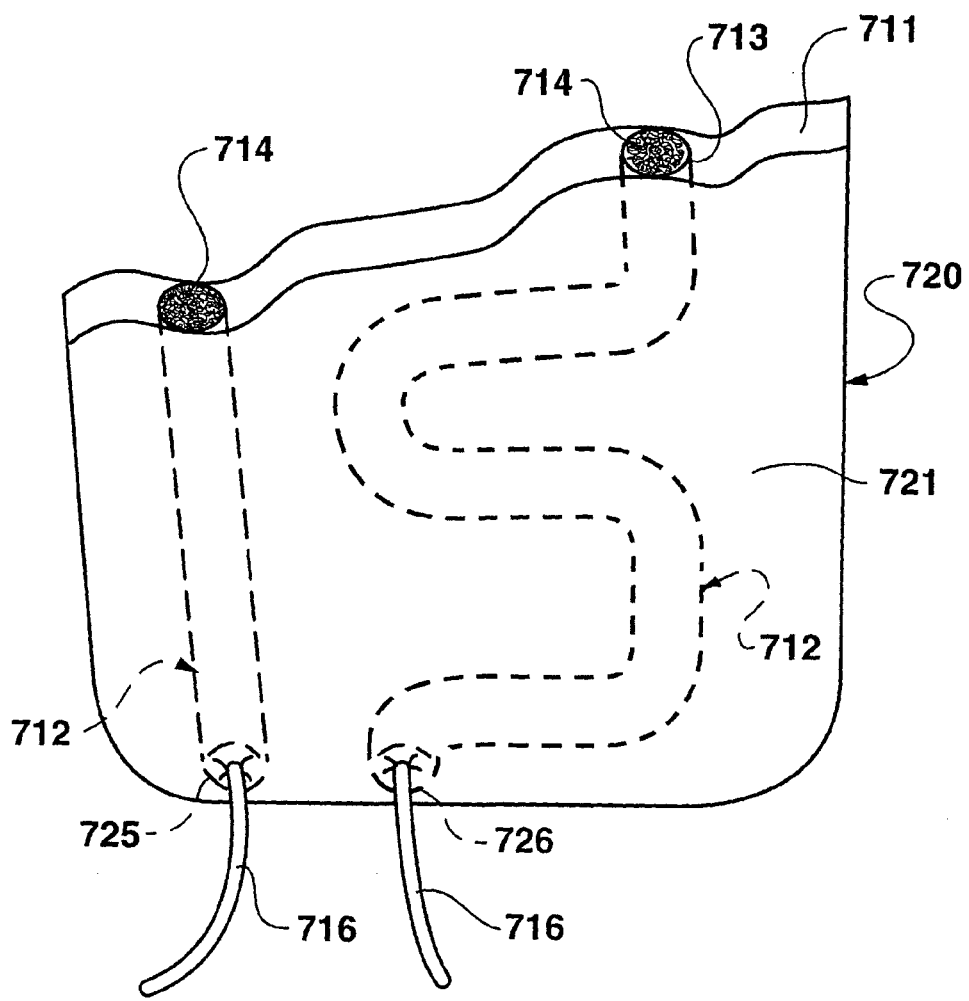
FIG. 8 shows a perspective view of a section of a garment having both a first and second substrate layer wherein connectors are connected to passageways within the garment.

In extreme climates, a further embodiment allows passageway 12 and 612 to act as a heat transfer unit by having a fluid $F_1$ flow through the passageway 12 and 612 as seen in FIGS. 1 and 7. As shown in FIGS. 2, 5 and 8, the passageway 112, 412 and 721 can be outfitted with connectors 116, 416 and 716, such as tubes or other types of fittings, at a fluid entrance 125, 425 and 725 and a fluid exit 126, 426 and 726 which are connectable to an portable external heat exchanger as known in the art which pumps the fluid $F_1$ through the passageway 112, 412 and 712. A garment may have multiple fluid entrances 125, 425 and 725 and exits 126, 426 and 726. Further, these connectors 116, 416 and 716 can also be connected to connectors 116, 416 and 716 of other panels of the same garment or to connectors 116, 416 and 716 of other garments, thereby limiting the number of pumps or heat exchangers that need to be carried by the wearer.

Depending on the climate, either a cold or warm fluid $F_1$ can be transported through passageway 112, 412 and 712. In hot climates, a cold fluid $F_1$ helps remove heat from the wearer's body, thereby aiding the moisture vapor transmission in cooling the wearer's body. In cold climates, a hot fluid $F_1$ helps transfer heat to the wearer's body, thereby warming the wearer's body. Depending on the permeability of the walls of passageway 112, 412 and 712, the fluid $F_1$ can be a liquid, such as water, an antifreeze solution or a gaseous substance such as air. In warm to hot climates where the surrounding temperature is below the wearer's skin temperature, ambient air may be circulated through passageway 112, 412 and 712. If a liquid is used as the fluid $F_1$, it is advantageous to have passageway 112, 412 and 712, the connectors 116, 416 and 716, and the heat exchanger to operate in a closed system.

As stated above, filler material 414 and 714 should be porous enough to allow fluid to flow through the filler material 414 and 714. Filler material 414 and 714 does not substantially impede the flow of the fluid. Since the fluid can flow through filler material 414 and 714, outer cover material 113, 413 and 713 does not have to expand or distend to allow the fluid to flow around filler material 414 and 714. This filler material 414 and 714 allows the fluid to flow more freely without having outer material 113, 413 and 713 being expandable, thereby requiring less pressure to circulate the flow of fluid. The lower pressure provides several advantages including less stress being placed on outer cover material 113, 413 and 713 and the joinings. Therefore, a lighter outer cover material may be used and the joinings of outer cover material 113, 413 and 713 are less critical. Also, the pump connected to the portable heat exchanger could be smaller, thereby also decreasing the weight associated with the garment 20 and 420. Further, the lower pressure also lowers the stress that garment 20 and 420 is placed under, thereby increasing the longevity of garment 20 and 420. The lower pressure makes garment 20 and 420, less rigid. A rigid garment can restrict the wearer's movements. Further, the porosity of filler material 414 and 714 does not isolate any part of the fluid as it flows through filler material 414 and 714 and passageway, thereby improving the heat transfer in relation to the wearer's body. These are just a few of the disadvantages avoided by using a filler material 414 and 714 as described above.

Filler material 414 and 714 contained within passageway 112, 412 and 712 also serves another purpose. It prevents the compression or collapse of the walls of passageway 112, 412 and 712. Filler material 414 and 714 adds structure supporting the walls of passageway 112, 412 and 712. Filler material 414 and 714 should give adequate support to prevent permanent deformation. In the case of embodiments that employ a fluid flow in passageway 112, 412 and 712 for heat transfer, filler material 414 and 714 prevents backflows and cutoffs in the passageway 112, 412 and 712 due to compression or collapse of the passageway 112, 412 and 712 by adding structure within the passageway and allowing the fluid to pass through the filler material 414 and 714. Even with creases in the passageway, the porosity of filler material 414 and 714 should allow the fluid to flow.

As stated above, FIG. 6 shows a first substrate layer 511 with a passageway 512 attached to the first substrate layer 511 in one embodiment of a process of manufacturing. The outer cover material 513 is thermally bonded to the first substrate layer 511 during a passageway forming process. Filler material 514 can be laid in a sheet on the surface of a non-thermoplastic first substrate layer 511 with a sheet of outer cover material 513 laid on top of filler material 514 prior to the cutting of outer cover material 513. In this embodiment, a thermal cutting device, including but not limited to ultrasonic cutting, simultaneously cuts outer cover material 513 and filler material 514 in the desired pattern and seals the cut edges of outer cover material 513 to first substrate layer 511, thereby forming passageway 512. Because first substrate layer 511 is not a thermoplastic, the process does not damage or negatively alter the characteristics of first substrate layer 511. A sheet, web or batting of filler material 514 may be disposed between two sheets of outer cover material 513 before being placed on first substrate layer 511 and before the forming of the passageway 512. Multiple passageways can be created by this process on each first substrate layer 511 used in making a composite fabric. The composite fabric, in turn, can be used to make products such as sleeping bags, blankets or garments.

Once the outer cover material 513 and filler material 514 are positioned and attached forming an enclosed passageway 512 on first substrate layer 511, the composite construction may be used alone or in combination with other materials in the preparation of any outer or inner wear garment or protective clothing, including but not limited to recreational or protective vests, jackets, pants and military combat uniforms. The material could also be used in protective head covering or footwear. The garments should not be limited to military or emergency response use and can be worn in conjunction with any outdoor activity or when the wearer is exposed to extreme environments.

In each of these embodiments, the wearer is benefited by the high moisture vapor transmission rate of the exposed areas of the first substrate layer that is not covered by the outer cover material in combination with the thermal insulative properties of the filler material. Also, the body is able to maintain comfort by having perspiration removed efficiently from the skin via vapor transport through the exposed portions of the first substrate layer, while having a fluid flowing through the enclosed passageway to further regulate the microclimate surrounding the targeted area of the wearer's body as needed.

It will be appreciated by those skilled in the art that various modifications and variations can be made in the present invention without departing from the scope of the invention. It is intended that the present invention include such modifications and variations as come within the scope of the appended claims and their equivalents.

The invention claimed is:

1. A composite structure for providing microclimate control to an area at least partially enclosed by said composite structure, said composite structure having a first side and a second side, said first side of said composite structure facing said area, said composite structure comprising:
   a first breathable substrate layer, said first breathable substrate layer comprising a first material;
   a second material juxtaposed to said first breathable substrate layer, said second material forming at least a portion of at least one wall defining a passageway adjacent said first substrate layer, wherein said passageway and said area are separated by at least said first breathable substrate layer, said second material being secured to said first substrate layer at predetermined locations, said passageway permitting fluid flow therethrough;
   a fluid entrance for permitting fluid flow into said passageway;
   a fluid exit for permitting fluid flow out of said passageway, said fluid exit directing fluid flow away from said area;
   a filler material in said passageway; and
   at least one connector secured to one of said fluid entrance and said fluid exit, said at least one connector permitting fluid flow therethrough.

2. The composite structure of claim 1, wherein said first breathable substrate layer is a fabric and said second material is a fabric.

3. The composite structure of claim 1, wherein said first material is a non-thermoplastic material.

4. The composite structure of claim 1, wherein a portion of said first breathable substrate layer forms at least a portion of at least one wall defining said passageway.

5. The composite structure of claim 1, wherein said passageway is fully defined by said second material.

6. The composite structure of claim 1, wherein said second material is a thermoplastic fabric selected from the group consisting of woven, knit, scrim and nonwoven.

7. The composite structure of claim 1, wherein said second material is non-permeable.

8. The composite structure of claim 1, wherein said second material is a thermoplastic film.

9. The composite structure of claim 1, wherein said filler material is fibrous.

10. The composite structure of claim 9, wherein said filler material is yarn.

11. The composite structure of claim 9, wherein said filler material is fabric selected from the group consisting of a woven, knit, braid and nonwoven.

12. The composite structure of claim 9, wherein said filler material is in the form of a fibrous structure selected from the group consisting of a web and batting.

13. The composite structure of claim 1, wherein said first material is a fabric selected from the group consisting of woven, knit and nonwoven.

14. The composite structure of claim 1, wherein said first breathable substrate layer has a moisture vapor transmission rate of at least about 500 grams per square meter per day.

15. The composite structure of claim 1, wherein said second material is mechanically secured to said first breathable substrate layer.

16. The composite structure of claim 1, wherein said second material is thermally secured to said first breathable substrate layer.

17. The composite structure of claim 1, wherein said second material is chemically secured to said first breathable substrate layer.

18. The composite structure of claim 1, further comprising a second breathable substrate layer secured to said second material at predetermined locations, said first substrate layer and said second substrate layer being about parallel to one another, said passageway being between said first breathable substrate layer and said second breathable substrate layer.

19. An article of clothing for providing microclimate control to an area at least partially surrounded by said article of clothing, said article of clothing including a first side facing said area, said article of clothing including:
  a composite structure comprising
    a first breathable substrate layer, said first breathable substrate layer comprising a first material;
    a second material secured to said first breathable substrate layer, said second material forming at least a portion of at least one wall defining a passageway, wherein said passageway and said area are separated by at least said first breathable substrate layer, said passageway occupying a predetermined area of a surface of said first substrate layer, said passageway permitting fluid flow therethrough;
    a fluid entrance for permitting fluid flow into said passageway;
    a fluid exit for permitting fluid flow out of said passageway, said fluid exit directing fluid flow away from said area;
    a filler material contained within said passageway;
    at least one connector secured to one of said fluid entrance and said fluid exit, said at least one connector permitting fluid flow therethrough.

20. The article of clothing of claim 19, wherein said first breathable substrate layer is a fabric and said second material is a fabric.

21. The article of clothing of claim 19, wherein said first material is a non-thermoplastic material.

22. The article of clothing of claim 19, wherein a portion of said first breathable substrate layer forms at least a portion of at least one wall defining said passageway.

23. The article of clothing of claim 19, wherein said passageway is completely defined by said second material.

24. The article of clothing of claim 19, wherein said second material is non-permeable.

25. The article of clothing of claim 19, wherein said filler material is fibrous.

26. The article of clothing of claim 19, wherein said first breathable substrate layer has a moisture vapor transmission rate of at least about 500 grams per square meter per day.

27. The article of clothing of claim 19, wherein said second material is mechanically secured to said first breathable substrate layer.

28. The article of clothing of claim 19, wherein said second material is thermally secured to said first breathable substrate layer.

29. The article of clothing of claim 19, wherein said second material is chemically secured to said first breathable substrate layer.

30. The article of clothing of claim 19, said composite structure further comprising a second breathable substrate layer secured to said second material, said first breathable substrate layer and said second breathable substrate layer being about parallel to one another, said passageway being between said first breathable substrate layer and said second breathable substrate layer.

31. The article of clothing of claim 19, wherein said composite structure is a single panel of said article of clothing.

32. The article of clothing of claim 31, wherein said article of clothing comprises multiple said panels.

33. The composite structure of claim 1, wherein said composite structure is at least a portion of a garment, a blanket, or a sleeping bag.

34. The composite structure of claim 1, wherein said fluid exit directs fluid flow away from said area and into the atmosphere.

35. The composite structure of claim 1, wherein said fluid exit directs fluid flow away from said area and to a recirculation pump.

36. The article of clothing of claim 19, wherein said article of clothing is a vest or a jacket.

37. The article of clothing of claim 19, wherein said article of clothing is a pair of pants.

38. The article of clothing of claim 19, wherein said article of clothing is a portion of a military uniform.

39. The article of clothing of claim 19, wherein said fluid exit directs fluid flow away from said area and into the atmosphere.

40. The article of clothing of claim 19, wherein said fluid exit directs fluid flow away from said area and to a recirculation pump.

* * * * *